United States Patent
Pattison et al.

(10) Patent No.: US 11,630,703 B2
(45) Date of Patent: Apr. 18, 2023

(54) CLUSTER UPDATE ACCELERATOR CIRCUIT

(71) Applicant: Microsoft Technology Licensing, LLC, Redmond, WA (US)

(72) Inventors: Christopher Anand Pattison, College Station, TX (US); Helmut Gottfried Katzgraber, Kirkland, WA (US); Matthias Troyer, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 725 days.

(21) Appl. No.: 16/743,386

(22) Filed: Jan. 15, 2020

(65) Prior Publication Data

US 2021/0216374 A1  Jul. 15, 2021

(51) Int. Cl.
| | |
|---|---|
| *G06N 5/02* | (2006.01) |
| *G06N 5/00* | (2006.01) |
| *G06F 9/50* | (2006.01) |
| *G06N 7/00* | (2023.01) |
| *G06F 17/11* | (2006.01) |

(52) U.S. Cl.
CPC ............ *G06F 9/5061* (2013.01); *G06F 17/11* (2013.01); *G06N 5/00* (2013.01); *G06N 7/005* (2013.01)

(58) Field of Classification Search
CPC ......... G06F 9/5061; G06F 17/11; G06N 5/00; G06N 7/005; G06N 5/022; G06N 5/003
See application file for complete search history.

(56) References Cited

U.S. PATENT DOCUMENTS

| | | | |
|---|---|---|---|
| 8,296,711 B2* | 10/2012 | Ispir ....................... | G06N 3/006 |
| | | | 716/132 |
| 2009/0319253 A1 | 12/2009 | Phillips et al. | |
| 2017/0161612 A1 | 6/2017 | Hastings et al. | |
| 2017/0337293 A1* | 11/2017 | Farkash ................ | G06F 16/254 |
| 2019/0164059 A1 | 5/2019 | Denchev et al. | |

(Continued)

OTHER PUBLICATIONS

Bojnordi et al., Memristive Boltzmann Machine: Hardware Acceleration for Combinatorial Optimization and Deep Learning, 2016, IEEE, pp. 1-13. (Year: 2016).*

(Continued)

*Primary Examiner* — Nghia M Doan
(74) *Attorney, Agent, or Firm* — Alleman Hall Creasman & Tuttle LLP

(57) ABSTRACT

A computing device is provided, including a cluster update accelerator circuit configured to receive signals encoding a combinatorial cost function of a plurality of variables and a connectivity graph for the combinatorial cost function. In an energy sum phase, the cluster update accelerator circuit may determine a respective plurality of accumulated energy change values for the combinatorial cost function based at least in part on the connectivity graph. In an update phase, the cluster update accelerator circuit may determine a respective update indicator bit for each accumulated energy change value. In an encoder phase, based on the plurality of update indicator bits, the cluster update accelerator circuit may select a largest update-indicated cluster of the variables included in the connectivity graph. The cluster update accelerator circuit may output an instruction to update the variables included in the largest update-indicated cluster.

20 Claims, 13 Drawing Sheets

(56) References Cited

U.S. PATENT DOCUMENTS

2020/0027016 A1    1/2020   Rouhani et al.
2020/0257998 A1    8/2020   Troyer et al.

OTHER PUBLICATIONS

Wende et al., Swendsen-Wang Multi-Cluster Algorithm for the 2D/3D Ising Model on Xeon Phi and GPU, Aug. 2013, ACM, pp. 13-44. (Year: 2013).*
"Notice of Allowance Issued in U.S. Appl. No. 16/272,851", dated Jun. 10, 2022, 8 Pages.
"Non Final Office Action Issued in U.S. Appl. No. 16/272,851", dated Feb. 17, 2022, 29 Pages.
Bojnordi, et al., "Memristive Boltzmann Machine: A Hardware Accelerator for Combinatorial Optimization and Deep Learning", In Proceedings of IEEE International Symposium on High Performance Computer Architecture, Mar. 12, 2016, 13 Pages.
Corana, et al., "Minimizing Multimodal Functions of Continuous Variables with the Simulated Annealing Algorithm", In Journal of ACM Transactions on Mathematical Software vol. 13, Issue 3, 1987, Sep. 1, 1987, pp. 262-280.
Greening, et al., "Parallel Simulated Annealing Techniques", In Journal of Physica D, vol. 42, Issue 3, Jun. 1, 1990, pp. 293-306.
"International Search Report and Written Opinion Issued in PCT Application No. PCT/US2020/015514", dated May 12, 2020, 12 Pages.
Albash, et al., "Demonstration of a Scaling Advantage for a Quantum Annealer Over Simulated Annealing", In Journal of Physical Review X, vol. 8, Issue 3, Jul. 19, 2018, pp. 1-28.
Albash, et al., "Simulated Quantum Annealing Comparison between All-to-All Connectivity Schemes", In the Repository of arXiv:1603.037552, Aug. 23, 2016, 18 Pages.
Ferber, et al., "Cluster Update and Recognition", In Repository of arXiv:cond-mat/0008013v1, Aug. 1, 2000, pp. 1-4.
Ochoa, et al., "Feeding The Multitude: A Polynomial-Time Algorithm to Improve Sampling", In Repository of arXiv:1801.07681v1, Jan. 23, 2018, 14 Pages.
"International Search Report and Written Opinion Issued in PCT Application No. PCT/US20/065046", dated Apr. 12, 2021, 32 Pages.
Rams, et al., "Heuristic Optimization and Sampling with Tensor Networks for Quasi-2D Spin Glass Problems", In Repository of arXiv:1811.06518v2, Nov. 24, 2018, pp. 1-14.
Wolff, Ulli, "Collective Monte Carlo Updating for Spin Systems", In Journal of Physical Review Letters, vol. 62, Issue 4, Jan. 23, 1989, pp. 361-364.
Zhu, et al., "Borealis—A Generalized Global Update Algorithm for Boolean Optimization Problems", In Repository of arXiv:1605.09399v1, May 30, 2016, pp. 1-20.
"Application as Filed in U.S. Appl. No. 16/272,851", filed Feb. 11, 2019, 51 Pages.
Isakov, et al., "Interplay of Quantum and Thermal Fluctuations in a Frustrated Magnet", In Journal of Physical Review 8, vol. 68, Issue 10, Sep. 10, 2003, 9 Pages.
Isakov, et al., "Understanding Quantum Tunneling through Quantum Monte Carlo Simulations", In Physical Review Letters, vol. 117, No. 18, Oct. 28, 2016, 15 Pages.
Johnson, et al., "Quantum Annealing with Manufactured Spins", In Journal of Nature, vol. 473, Issue 7346, May 12, 2011, pp. 194-198.
Kadowaki, et al., "Quantum Annealing in the Transverse Ising Model", In Journal of Physical Review E, vol. 58, Issue 5, Nov. 1, 1998, 23 Pages.
Wang, et al., "Cluster Monte Carlo Algorithms", In Journal of Physica A: Statistical Mechanics and its Applications, vol. 167, Issue 3, Jun. 9, 1990, pp. 565-579.
"Notice of Allowance Issued in U.S. Appl. No. 16/272,851", dated Sep. 23, 2022, 9 Pages.

* cited by examiner

200

: Flip Priority Encoder Logic

1 Function *Encoder(f, C):*
    Input: Vector of individual flip bits $f$ with $len(f) = n$
    Input: Carry bit $C$
    Input: Subset of edges $c$ with $len(c) = len(f)$
    Output: $g$ such that entire clusters are flipped /* Carry in                                   */
2     if $c_n$ then
3         $g_n \leftarrow C$
4     else
5         $g_n \leftarrow f_n$
6     end

/* If we encounter a 1 keep carrying the value otherwise pass $f_k$ through and carry it down     */
7     for $k$ *in* $len(g) - 1$ *downto* $0$ do
8         if $c_k$ then
9             $g_k \leftarrow g_{k+1}$
10        else
11            $g_k \leftarrow f_k$
12        end
13    end

FIG. 5

Algorithm 1: Swendsen-Wang Algorithm for Simulated Quantum Annealing

```
1  Function FlipClusters(x, δE):
      Input:  Vector x of variable replicas along imaginary time direction with
              x_k ∈ {0,1}
      Input:  Vector of energy change in spatial direction δE for each replica
      Output: New assignment x'
      Data:   Cluster growth rule GrowCluster
      Data:   Cluster flip probability rule FlipProb
      Data:   Bit string C with len(C) = len(x) − 1 representing broken edges
2     c ← GrowCluster(x)         /* Sets of indices representing
                                    clusters */
3     foreach g in GetClusters(C) do
4        if FlipProb(∑_{k∈g} δE_k) > rand() then      /* Flip cluster */
5        |     x'_g ← ¬x_g       /* Do this for each integer in g */
6        else
7        |     x'_g ← x_g
8        end
9     end
10    return x'
11
12 Function GetClusters(C):
      Output: Clusters represented as sets of lists of indices
      Data:   List of List of integers G
      Data:   List of integers g
13    g ← [0]
14    for 0 ≤ k < len(C) do
15       if c_k = 1 then
16       |    g.append(k + 1)                 /* append k to g */
17       end
18       G.append(g)                          /* append g to G */
19       g ← [k + 1]
20    end
21    G.append(g)
22    return G
```

FIG. 7A

```
1  Function FlipProb(δE):
      Input: Energy change for a cluster
      Output: Flip probability p
      Data: Algorithm parameter β
2     p ← ½ exp −βδE
3  Function GrowCluster(x):
      Input: Current variable assignment x for all replicas
      Output: Cluster edges c
      Data: Cluster growth stop probability p_s = exp(−2βb)
4     foreach c_k do
5        if p_s > rand() or x_k ≠ x_{k+1} then
6           c_k ← 0
7        else
8           c_k ← 1
9        end
10    end
```

230

---

Algorithm 2: Simulated Quantum Annealing with Swendsen-Wang updates

```
1  Function SQA(H_p, t_anneal):
      Input: Cost function H_p
      Input: Annealing time t_anneal
      Input: Schedule for B(t)
      Output: Assignment of variables x
      /* Initialization                                    */
2     x ← random bit vector
      /* Annealing                                         */
3     foreach t in 0 to t_anneal do
4         B ← B(t)              /* Annealing schedule   */
5         foreach i in 0 to N − 1 do
              /* Compute spatial energy change            */
6             foreach k in 0 to P − 1 do
7                 y ← x
8                 y_{i,k} ← ¬y_{i,k}
9                 δE_k ← H_{P,k}(y) − H_{P,k}(x)
10            end
11            x_{i,−} ← SW(x_{i,−}, δE, p_s(B))
12        end
13    end
14    return x
```

FIG. 7C

CLUSTER UPDATE ACCELERATOR CIRCUIT

BACKGROUND

A cost function is a scalar-valued function of one or more discrete or continuous variables. For example, a cost function may be a sum of weighted terms that each depend on one or more variables. In a wide variety of applications, such as logistics, machine learning, and material design, it is useful to maximize or minimize a cost function. Determining the maximum or minimum of a cost function is frequently an NP-hard problem for which it would not be feasible to find an exact solution. Instead, maxima and minima of cost functions are more frequently approximated by numerical methods.

SUMMARY

According to one aspect of the present disclosure, a computing device is provided, including a cluster update accelerator circuit configured to receive signals encoding a combinatorial cost function of a plurality of variables and a connectivity graph for the combinatorial cost function. In an energy sum phase, the cluster update accelerator circuit may be further configured to determine a respective plurality of accumulated energy change values for the combinatorial cost function based at least in part on the connectivity graph. In an update phase, the cluster update accelerator circuit may be further configured to determine a respective update indicator bit for each accumulated energy change value. In an encoder phase, based on the plurality of update indicator bits, the cluster update accelerator circuit may be further configured to select a largest update-indicated cluster of the variables included in the connectivity graph. The cluster update accelerator circuit may be further configured to output an instruction to update the variables included in the largest update-indicated cluster.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows example pseudo-code for the flip priority encoder logic of a priority encoder included in the cluster update accelerator circuit of FIG. 3.

FIG. 7A shows example pseudo-code for a Swendsen-Wang update used in simulated quantum annealing, according to the embodiment of FIG. 1.

FIG. 7C shows example pseudo-code for performing simulated quantum annealing when the algorithms of FIGS. 7A and 7B are used to perform a Swendsen-Wang update.

DETAILED DESCRIPTION

According to one example, a cost function may be a polynomial with variables x and real-valued weights T. Thus, the cost function may have the following form:

$$H = \sum_i T_i x_i + \sum_{ij} T_{ij} x_i x_j + \sum_{ijk} T_{ijk} x_i x_j x_k + \ldots$$

In this example, the goal is to minimize the value H of the cost function. The cost function may be a combinatorial cost function in which each variable has a discrete value. For example, each variable may take a value in the set $\{0,1\}$ or $\{-1,1\}$. Alternatively, one or more of the variables may be continuous-valued.

Heuristic solvers typically attempt to make an update $x \rightarrow x'$ to the variable assignment that is accepted with a probability $p(H(x')-H(x))$. In some instances, a single variable may be updated at a time. However, the value H of the cost function may sometimes converge toward the minimum more quickly when multiple variables are updated at a time. When two or more variables are updated together, those variables are referred to as a cluster, and the update to the variable assignment that changes the values of the variables in the cluster is referred to as a cluster update.

When a cluster update is performed, the variables included in the cluster are first selected in a cluster growth step. After the variables have been selected, a cluster update is attempted with a probability of $p(H(x')-H(x))$ in a cluster update step. The variables may be selected in the cluster growth step based on structural properties of the cost function. For example, a connectivity graph may be determined for the cost function. In the connectivity graph, each variable may be represented by a vertex, and each pair of variables that occur together in a cost function term of nonzero weight may be represented by an edge between the vertices that represent the variables of the pair. Clusters of variables may then be selected from the connectivity graph. In an updating step subsequent to the selection of the variables included in the cluster, the variables included in the cluster may be updated together as single hypervariable.

Figure 1:
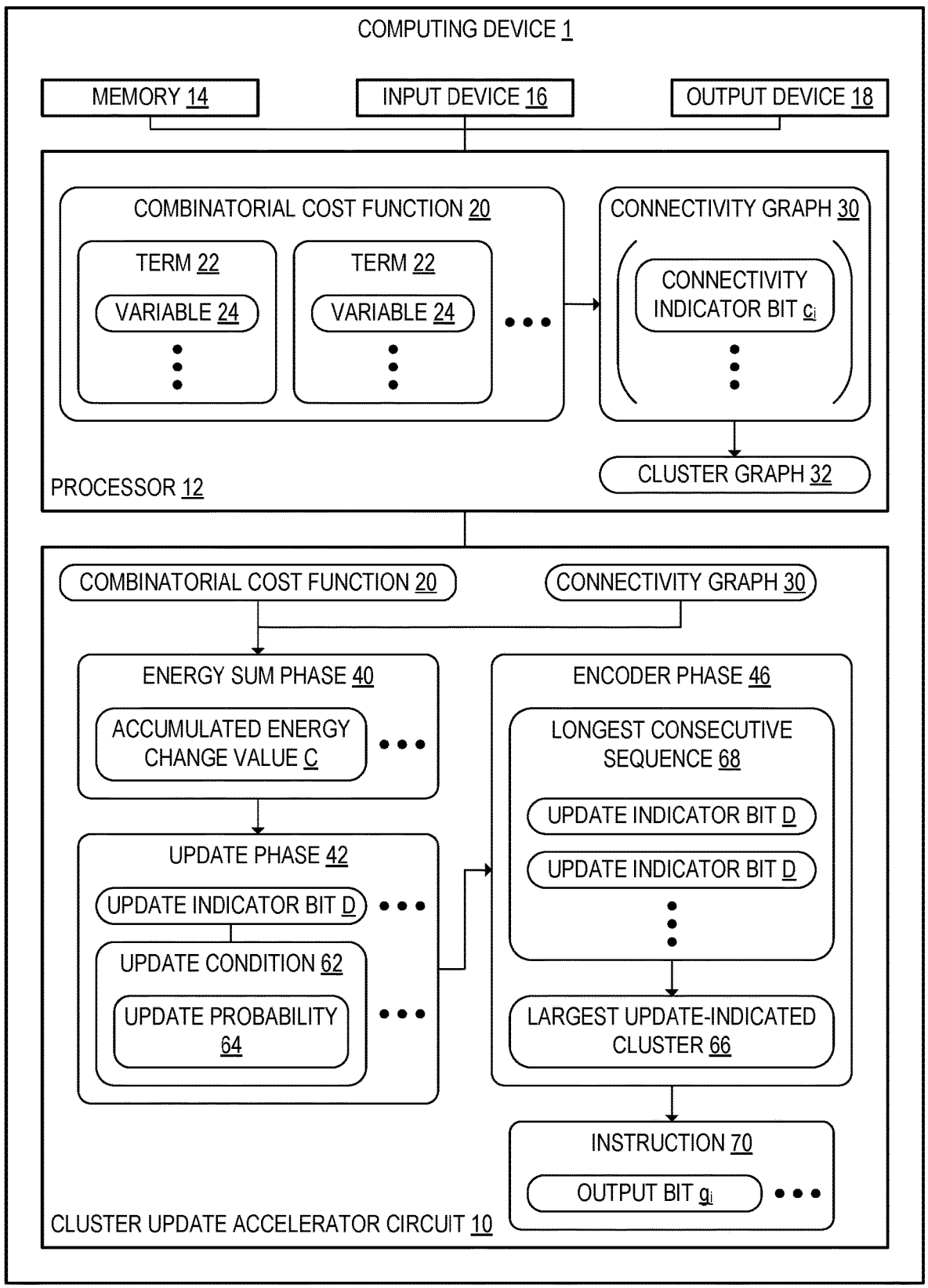
FIG. 1 schematically shows a computing device including a cluster update accelerator circuit, according to one example embodiment.

FIG. 1 schematically shows an example computing device 1 that may be used to accelerate the process of performing a cluster update to a cost function. The computing device 1 may include a cluster update accelerator circuit 10, as described in further detail below. The cluster update accelerator circuit 10 may, for example, be a field-programmable gate array (FPGA) or an application-specific integrated circuit (ASIC). Alternatively, the cluster update accelerator circuit 10 may have some other pipelined architecture. The computing device 1 may further include a processor 12 that may be communicatively coupled to the cluster update accelerator circuit 10. In addition, the computing device 1 may further include memory 14, which may be communicatively coupled to the processor 12. The computing device may additionally or alternatively include one or more input devices 16 and/or one or more output device 18, which may be communicatively coupled to the processor 12. Via the one or more input devices 16 and the one or more output devices 18 respectively, the computing device 1 may receive inputs from, and communicate outputs to, one or more users and/or other computing devices. In some embodiments, the functions of the processor 12, memory 14, one or more input devices 16, and/or the one or more output devices 18 may be distributed across a plurality of physical computing devices that are communicatively coupled via their respective input devices 16 and output devices 18.

The cluster update accelerator circuit 10 may be configured to receive signals from the processor 12. These signals may encode a combinatorial cost function 20 of a plurality of variables 24. The combinatorial cost function 20 may, for example, be a sum of a plurality of terms 22 that each include one or more of the variables 24. In some embodiments, each variable 24 of the combinatorial cost function 20 may be a binary variable having two possible values. Alternatively, one or more variables 24 of the combinatorial cost function 20 may be a discrete variable with some other number of possible values.

The signals received by the cluster update accelerator circuit 10 from the processor 12 may further encode a connectivity graph 30 for the combinatorial cost function 20. As discussed above, the connectivity graph 30 may indicate each variable 24 of the combinatorial cost function 20 as a vertex and may include edges between variables 24 that occur together in at least one term 22 of the combinatorial cost function 20. In some embodiments, the connectivity graph 30 may be encoded as an adjacency matrix. Alternatively, in embodiments in which the connectivity graph 30 has fewer than two cycles, the connectivity graph 30 may be encoded as a vector. In such embodiments, the connectivity graph 30 may be a vector of respective connectivity indicator bits $c_i$ of the variables 24 included in the combinatorial cost function 20. The processor 12 may, in some embodiments, be configured to generate a reduced-connectivity graph with fewer than two cycles from the full connectivity graph 30 when the connectivity graph 30 has two or more cycles, as discussed in further detail below.

Figure 2:
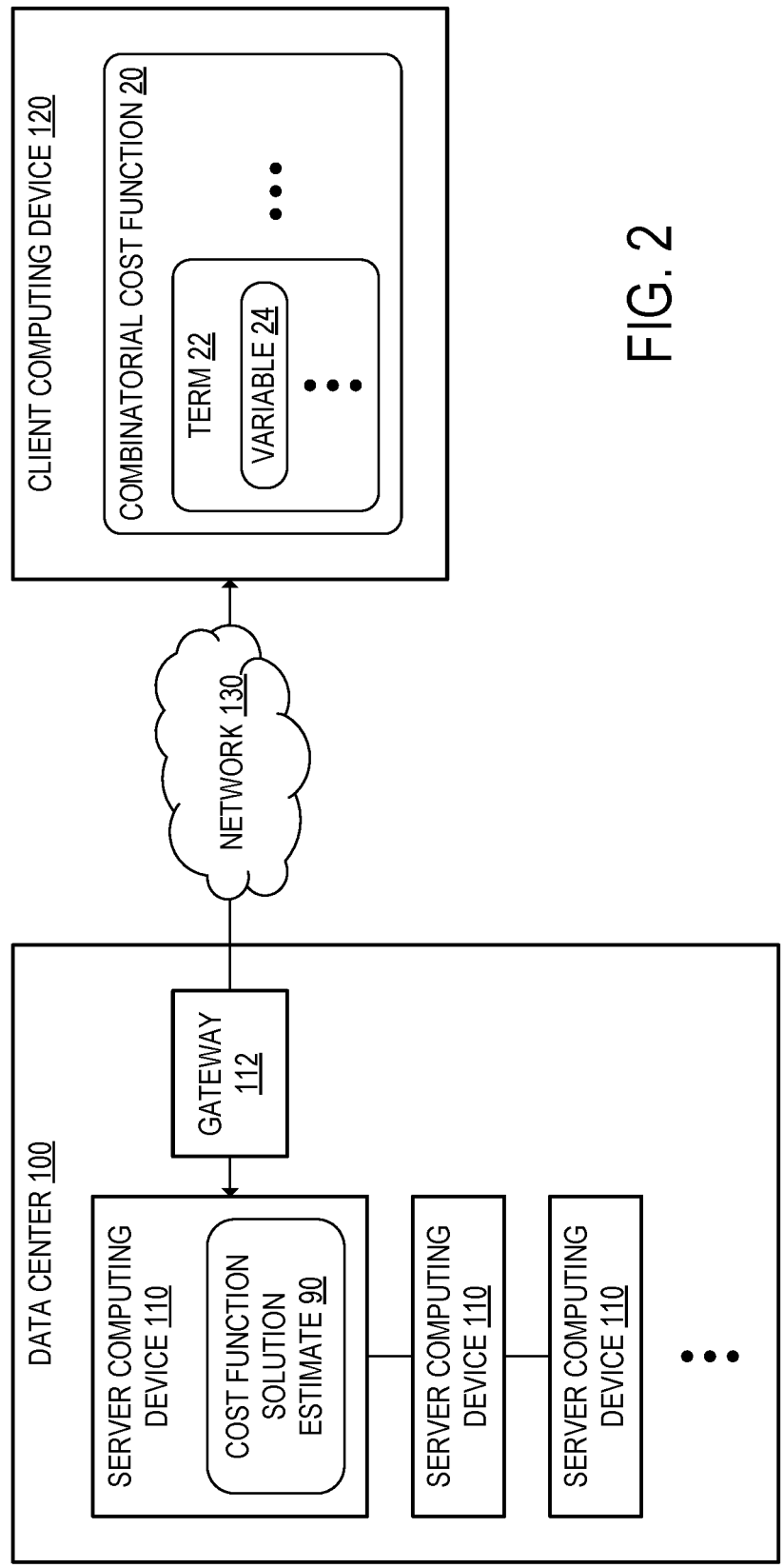
FIG. 2 shows a server computing device configured to receive a combinatorial cost function from a client computing device, according to the embodiment of FIG. 1.

In some embodiments, as shown in FIG. 2, the computing device 1 may be a server computing device 110. The server computing device 110 may be located in a data center 100 as part of a fabric of communicatively interconnected server computing devices 110. In such embodiments, the server computing device 110 may be configured to receive the combinatorial cost function 20 via a network 130. The combinatorial cost function 20 may be received from a client computing device 120. When the combinatorial cost function 20 is received at the data center 100, the client input including the combinatorial cost function 20 may be routed to the server computing device 110 via a gateway 112. In addition, the server computing device 110 may compute a cost function solution estimate 90, which may be conveyed back to the client computing device 120 over the network 130. The cost function solution estimate 90 may include an estimated minimum or maximum of the combinatorial cost function 20, as well as the values of the variables 24 when the combinatorial cost function 20 has the estimated minimum or maximum value. Thus, the client computing device 120 may offload combinatorial cost function optimization problems to the server computing device 110.

Returning to FIG. 1, the cluster update accelerator circuit 10 may perform an energy sum phase 40 subsequently to receiving the signals encoding the combinatorial cost function 20 and the connectivity graph 30. In the energy sum phase, the cluster update accelerator circuit 10 may be configured to determine a respective plurality of accumulated energy change values C for the combinatorial cost function 20 based at least in part on the connectivity graph 30. Each accumulated energy change value C may be a sum of respective energy change values $\delta E_i$ for the variables 24 included in all or part of a cluster, where i=1, . . . , n for a combinatorial cost function 20 with n variables 24. Thus, the accumulated energy change value C for a cluster may indicate a change in the value of the combinatorial cost function 20 that would occur if the variables 24 in the cluster were updated.

Figure 3:
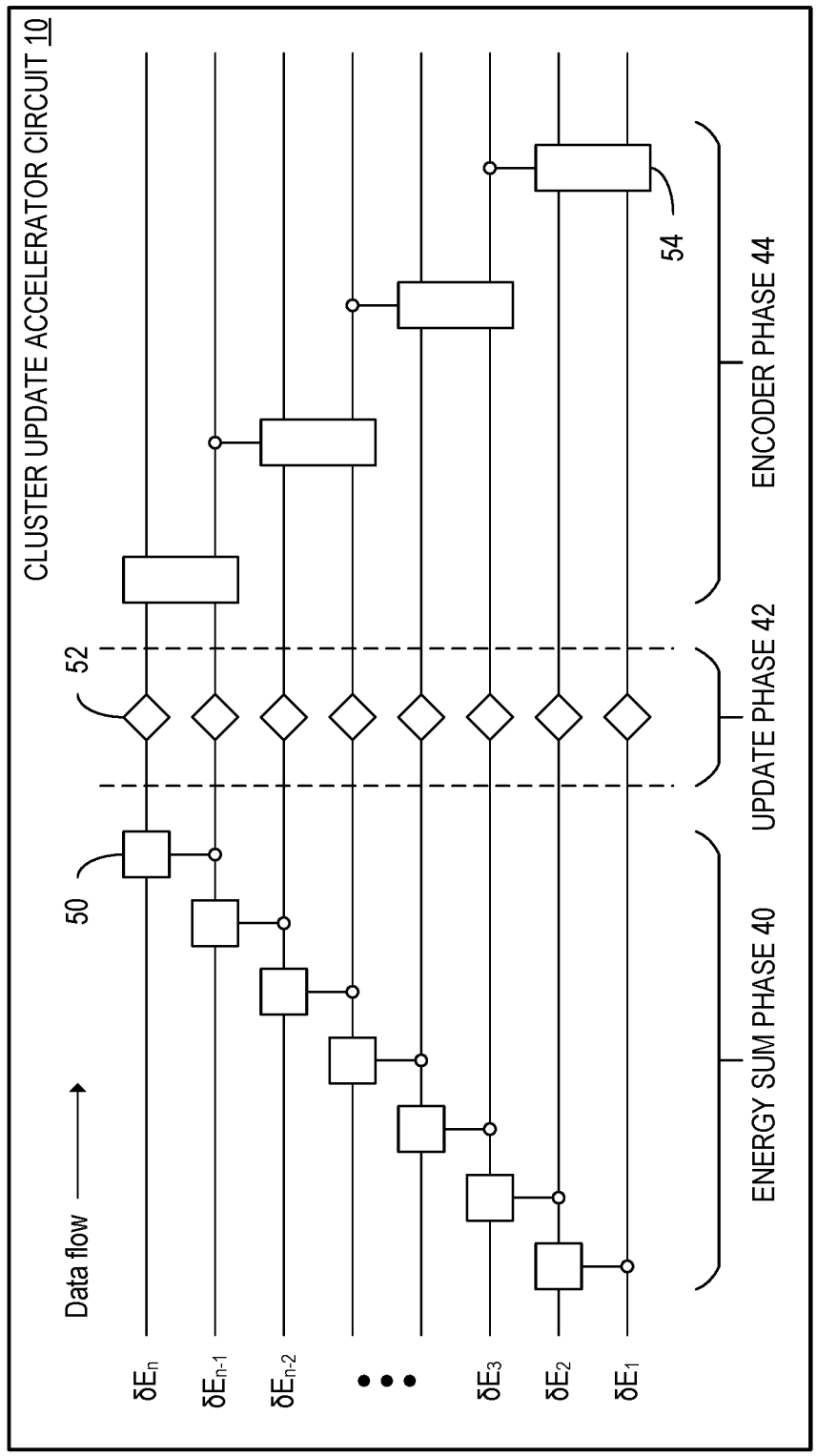
FIG. 3 shows an example cluster update accelerator circuit, according to the embodiment of FIG. 1.
Figure 4A:
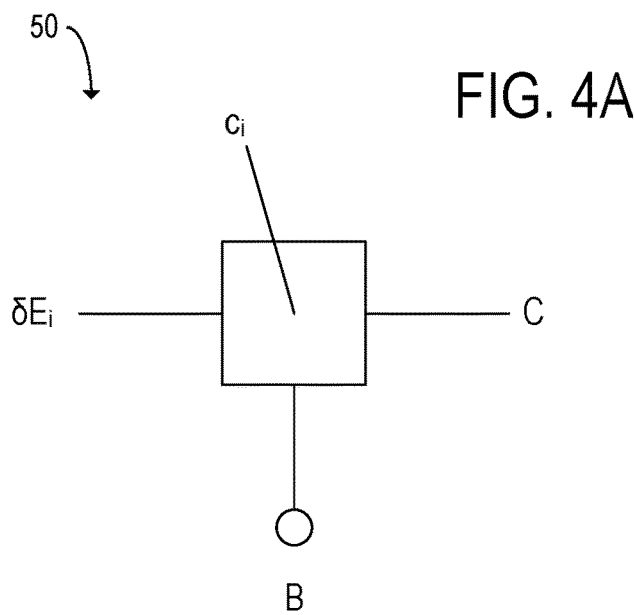
FIG. 4A shows an example accumulator that may be included in the cluster update accelerator circuit of FIG. 3.

FIG. 3 shows an example cluster update accelerator circuit 10. In the example of FIG. 3, the energy sum phase 40 is performed at a plurality of accumulators 50, each of which is configured to determine a respective accumulated energy change value C for a pair of energy change values. FIG. 4A shows an accumulator 50 in additional detail. In the example of FIG. 4A, the accumulator 50 is configured to receive a first energy change value $\delta E_i$, a second energy change value B, and a connectivity indicator bit $c_i$. The connectivity indicator bit $c_i$ may be included in a vector of connectivity indicator bits $c_i$ in embodiments in which the connectivity graph 30 includes fewer than two cycles. Each connectivity bit $c_i$ may indicate, for the $i^{th}$ variable 24 of the combinatorial cost function 20, whether the connectivity graph 30 includes an edge between that variable 24 and the $i+1^{st}$ variable 24.

At each accumulator 50, if the connectivity indicator bit $c_i$ has a first value, that accumulator 50 may be configured to set the accumulated energy change value C to the first energy change value $\delta E_i$. Otherwise, when the connectivity bit $c_i$ has a second value, the accumulator 50 may be configured to set the accumulated energy change value C to a sum of the first energy change value $\delta E_i$ and the second energy change value B. In some embodiments, the first value of the connectivity indicator bit $c_i$ may be zero and the second value of the connectivity indicator bit $c_i$ may be one. Alternatively, the first value of the connectivity indicator bit $c_i$ may be one and the second value of the connectivity indicator bit $c_i$ may be zero.

As shown in FIG. 3, the first accumulator 50 in the data flow sequence receives $\delta E_2$ as the first energy change value and receives $\delta E_1$ as the second energy change value. For each accumulator 50 following the first accumulator 50 in the data flow sequence, the first energy change value is the energy change value $\delta E_i$ for a variable, and the second energy change value is an accumulated energy change value C received from the previous accumulator 50. Thus, in the energy sum phase 40, the plurality of accumulators 50 may determine accumulated energy change values C for connected clusters of variables in the connectivity graph 30.

Figure 4B:
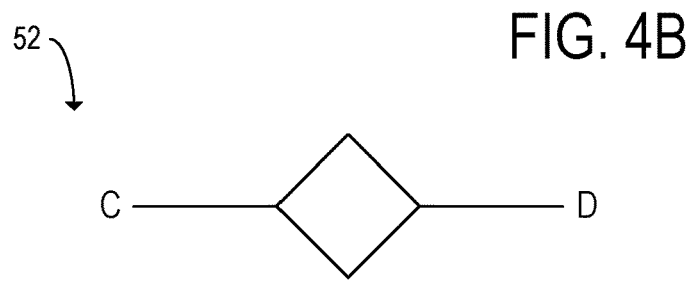
FIG. 4B shows an example update criterion checker that may be included in the cluster update accelerator circuit of FIG. 3.

The cluster update accelerator circuit 10 may be further configured to perform an update phase 42. In the update phase 42, the cluster update accelerator circuit 10 may be configured to determine a respective update indicator bit D for each accumulated energy change value C. Each update indicator bit D may be determined at a respective update criterion checker 52. An example update criterion checker 52 is shown in FIG. 4B. The update criterion checker 52 may be configured to receive an accumulated energy change value C of the plurality of accumulated energy change values C determined during the energy sum phase 40. Each accumulated energy change value C may be received from a respective accumulator 50.

Each update criterion checker 52 may be further configured to set the update indicator bit D to a second value with an update probability 64 based on the accumulated energy change value C. In one example, the update condition 62 under which the update indicator bit D is set to the second value may be the Metropolis-Hastings update condition, $$\text{rand}(\ ) < e^{-\beta C}$$

where $\beta$ is an inverse temperature and rand( ) is a random or pseudorandom number between 0 and 1. The update probability 64 is the probability that the update condition 62 is satisfied for a given value of C. As an alternative to the update condition 62 shown above, other update conditions 62 may be used. The second value to which the update criterion checker 52 sets the update indicator bit D may be one. In other embodiments, the second value may be zero.

Returning to FIG. 3, the cluster update accelerator circuit 10 may be further configured to perform an encoder phase 44. In the encoder phase 44, the cluster update accelerator circuit 10 may be configured to select a largest update-indicated cluster 66 of the variables 24 included in the combinatorial cost function 20 based on the plurality of update indicator bits D. The largest update-indicated cluster 66 may be a largest cluster of consecutive variables 24 for which the respective update indicator bits D of those variables 24 are all set to the second value (e.g. one). Thus, in the encoder phase 44, the cluster update accelerator circuit 10 may identify the longest chain of variables 24 with respective accumulated energy change values C that all satisfy the update condition 62 at the update phase 42.

Figure 4C:
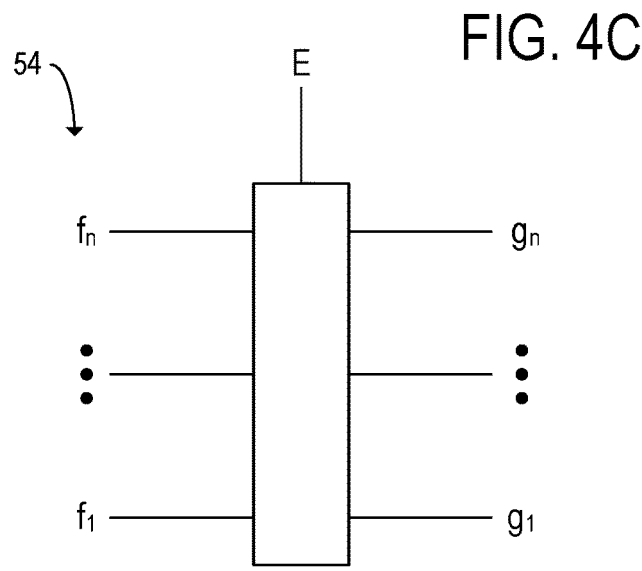
FIG. 4C shows an example priority encoder that may be included in the cluster update accelerator circuit of FIG. 3.

As shown in the example of FIG. 3, the largest update-indicated cluster 66 may be selected by a plurality of priority encoders 54. An example priority encoder 54 is shown in further detail in FIG. 4C. Each priority encoder 54 may be configured to receive two or more update indicator bits D of the plurality of update indicator bits D. In FIG. 4C, the update indicator bits D used as inputs at the priority encoder 54 are labeled $f_1, \ldots, fn$. Each priority encoder 54 may be further configured to identify a longest consecutive sequence 68 of the two or more update indicator bits $f_i$ that are set to the second value (e.g. one). Sequences of consecutive update indicator bits $f_i$ that are set to the second value may indicate connected components of the cluster graph 32. The priority encoder 54 may be further configured to output a plurality of output bits $g_i$ including a respective instance of the second value for each of the two or more update indicator bits $f_i$ included in the longest consecutive sequence 68. Thus, in the encoder phase 44, each priority encoder 54 may determine whether the update indicator bits $f_i$ that it receives as inputs form a sequence of consecutive instances of the second value.

In some embodiments, at least one priority encoder 54 of the plurality of priority encoders 54 is further configured to receive an output bit E of the plurality of output bits $g_i$ of another priority encoder 54 of the plurality of priority encoders 54. In the example of FIG. 3, each priority encoder 54 other than the first priority encoder 54 in the data flow sequence is configured to receive an output bit E from another priority encoder 54. The at least one priority encoder 54 may be further configured to select the largest update-indicated cluster 66 based at least in part on the output bit E. When the received output bit E has the second value, the priority encoder 54 may include the received output bit E as included in the sequence of consecutive update indicator bits $f_i$ that have the second value. Thus, the update indicator bits $f_i$ received by the priority encoder 54 may be treated as a continuation of the sequence identified by the previous priority encoder 54 when those update indicator bits $f_i$ have the second value.

FIG. 5 shows pseudo-code 200 for the flip priority encoder logic of a priority encoder 54, according to the example of FIG. 3. In the pseudo-code 200, the output bit E is referred to as the carry bit C. The plurality of priority encoders 54 may be configured to output an instruction 70 to update the variables 24 included in the largest update-indicated cluster 66, as shown in FIG. 1. In the example of FIG. 5, the output of the priority encoder 54 is a vector that includes a one for each variable 24 included in the largest update-indicated cluster 66 and a zero for each other variable 24.

After the cluster update accelerator circuit 10 has output the instruction 70 to update the variables included in the largest up date-indicated cluster 66, the instruction 70 may be received at the processor 12. The processor 12 may be further configured to update the variables 24 included in the largest update-indicated cluster 66 according to the instruction 70. As discussed above with reference to FIG. 2, the variables 24 may be updated when computing a cost function solution estimate 90 to be output to a client computing device 120. The cost function solution estimate 90 may be computed using a Markov chain Monte Carlo algorithm in which the processor 12 may modify the variables 24 with probabilities computed from prior states of the combinatorial cost function 20. For example, the processor 12 may be configured to update the variables 24 of the combinatorial cost function 20 when performing a simulated annealing, simulated quantum annealing, or parallel tempering algorithm to compute the cost function solution estimate 90. Alternatively, the processor 12 may be configured to update the variables 24 when performing some other method of estimating a maximum or a minimum of the cost function 20.

The processor 12 may be configured to perform a cluster update when executing one of a variety of different cluster update algorithms. For example, the processor 12 may be configured to update the variables 24 of the combinatorial cost function 20 when performing an isoenergetic cluster move, a Wolff update, or a Swendsen-Wang update. In each of these cluster update algorithms, the processor 12 may be configured to generate a cluster graph 32 including a plurality of vertices and edges each time a cluster update is performed. The processor 12 may be further configured to update the values of one or more of the variables 24 of the combinatorial cost function 20 based at least in part on properties of the cluster graph 32.

Figure 6:
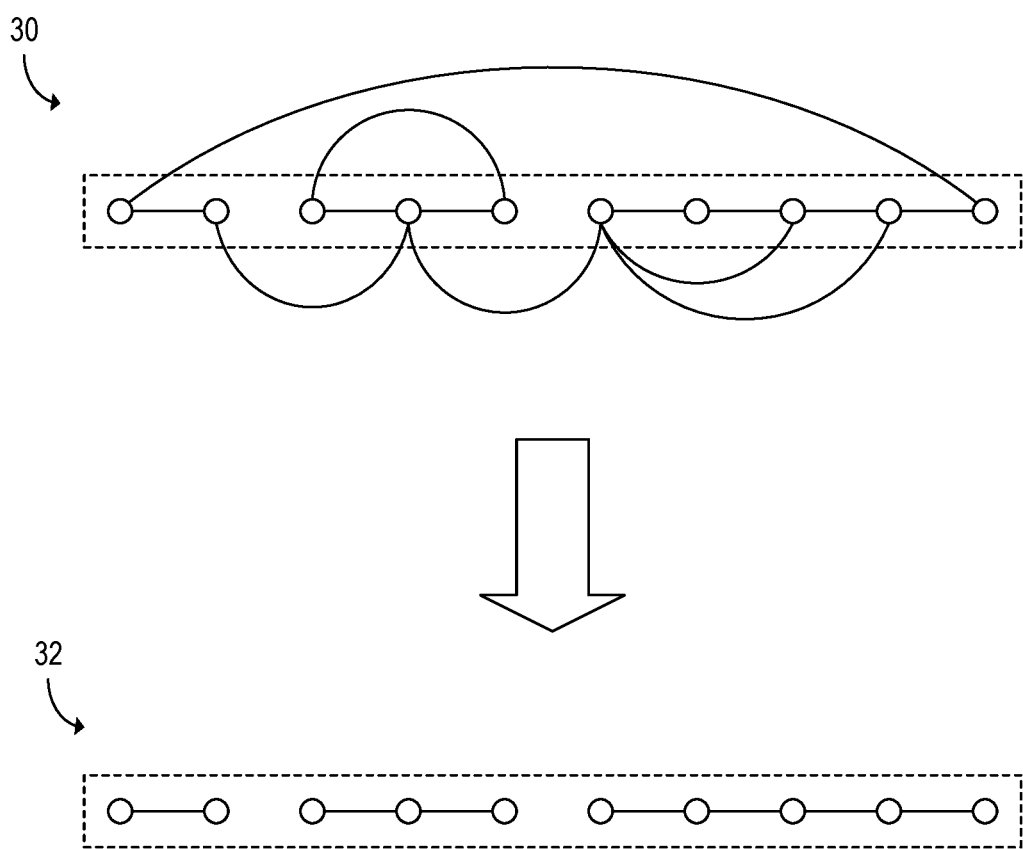
FIG. 6 shows an example reduction of a connectivity graph to a cluster graph, according to the embodiment of FIG. 1.

FIG. 6 shows an example reduction of a connectivity graph 30 to a cluster graph 32, which may be a reduced-connectivity graph. In the example of FIG. 6, the connectivity graph 30 includes a plurality of cycles. To form the cluster graph 32, the processor 12 may remove edges from the connectivity graph 30 such that the cluster graph 32 formed by removing edges has fewer than two cycles. Alternatively, the processor 12 may form the cluster graph 32 by iteratively adding edges from the connectivity graph 30 to a plurality of vertices corresponding to respective variables 24 of the combinatorial cost function 20. A plurality of different cluster graphs 32 may be generated from the same connectivity graph 30 by removing different edges. Although the cluster graph 32 shown in FIG. 6 includes no cycles, the processor 12 may alternatively generate a cluster graph 32 that includes one cycle. Including fewer than two cycles in the cluster graph 32 may allow the cluster graph 32 to be represented as a vector.

Example methods by which the processor 12 may compute the cluster graph 32 are discussed below. In each of the examples provided below, a subset of the variables 24 of the combinatorial cost function 20 is stochastically selected based on a current state of the algorithm and the value of the combinatorial cost function 20. These example methods of generating the cluster graph 32 are non-exhaustive, and other methods of generating the cluster graph 32 may be used in other embodiments.

When performing an isoenergetic cluster move, the processor 12 may be configured to compute a cluster graph 32 from the combinatorial cost function 20 and from a first variable assignment vector x and a second variable assignment vector y that each include a respective value for each variable 24. The processor 12 may be further configured to compute an elementwise product vector w, where $w_i = x_i y_i$. The processor 12 may be further configured to compute a cluster graph 32 from the connectivity graph 30 by removing edges from the connectivity graph 30 for which $w_i \neq w_j$, where i and j are two vertices that share an edge in the connectivity graph 30. After computing the cluster graph 32, the processor 12 may be further configured to flip each variable 24 included in a single connected component of the cluster graph 32 in both the first variable assignment vector x and the second variable assignment vector y. The connected component of the cluster graph 32 may be identified using the cluster update accelerator circuit 10.

When performing a Wolff update, the processor 12 may be configured to compute a cluster graph 32 from the combinatorial cost function 20 and a first variable assignment vector x. The processor 12 may be further configured to compute the cluster graph 32 by adding edges from the connectivity graph 30 of the combinatorial cost function 20 with a probability $p(x_i, x_j, T_{ij})$ in a graph traversal starting from a single vertex. In the expression for the probability, $T_{ij}$ is the weight of the term 22 that includes $x_i$ and $x_j$. The processor 12 may continue to add edges until no more edges could be added without creating a new connected component. The processor 12 may be further configured to update the values of the variables 24 in the connected component with a probability based on the values $x_i$ and $x_j$ of the variables 24 included in the connected component and the weights $T_{ij}$ of the terms in which those variables 24 are included.

Figure 7B:
FIG. 7B shows pseudo-code for a flip probability subroutine of the Swendsen-Wang algorithm of FIG. 7A.

When performing a Swendsen-Wang update, the processor 12 may be configured to compute the cluster graph 32 from the combinatorial cost function 20 and a first variable assignment vector x. The processor 12 may be configured to compute the cluster graph 32 by removing edges from the connectivity graph 30 with a probability $p(x_i, x_j, T_{ij})$. The processor 12 may be further configured to flip each connected component of the cluster graph 32 with a probability based on the values $x_i$ and $x_j$ of the variables 24 included in the connected component and the weights $T_{ij}$ of the terms in which those variables 24 are included. FIG. 7A shows pseudo-code 210 of a Swendsen-Wang algorithm for simulated quantum annealing. In addition, FIG. 7B shows pseudo-code 220 of a flip probability subroutine of the Swendsen-Wang algorithm for simulated quantum annealing. FIG. 7C shows example pseudo-code 230 for performing simulated quantum annealing when the algorithms of FIGS. 7A and 7B are used to perform a Swendsen-Wang update.

Figure 8A:
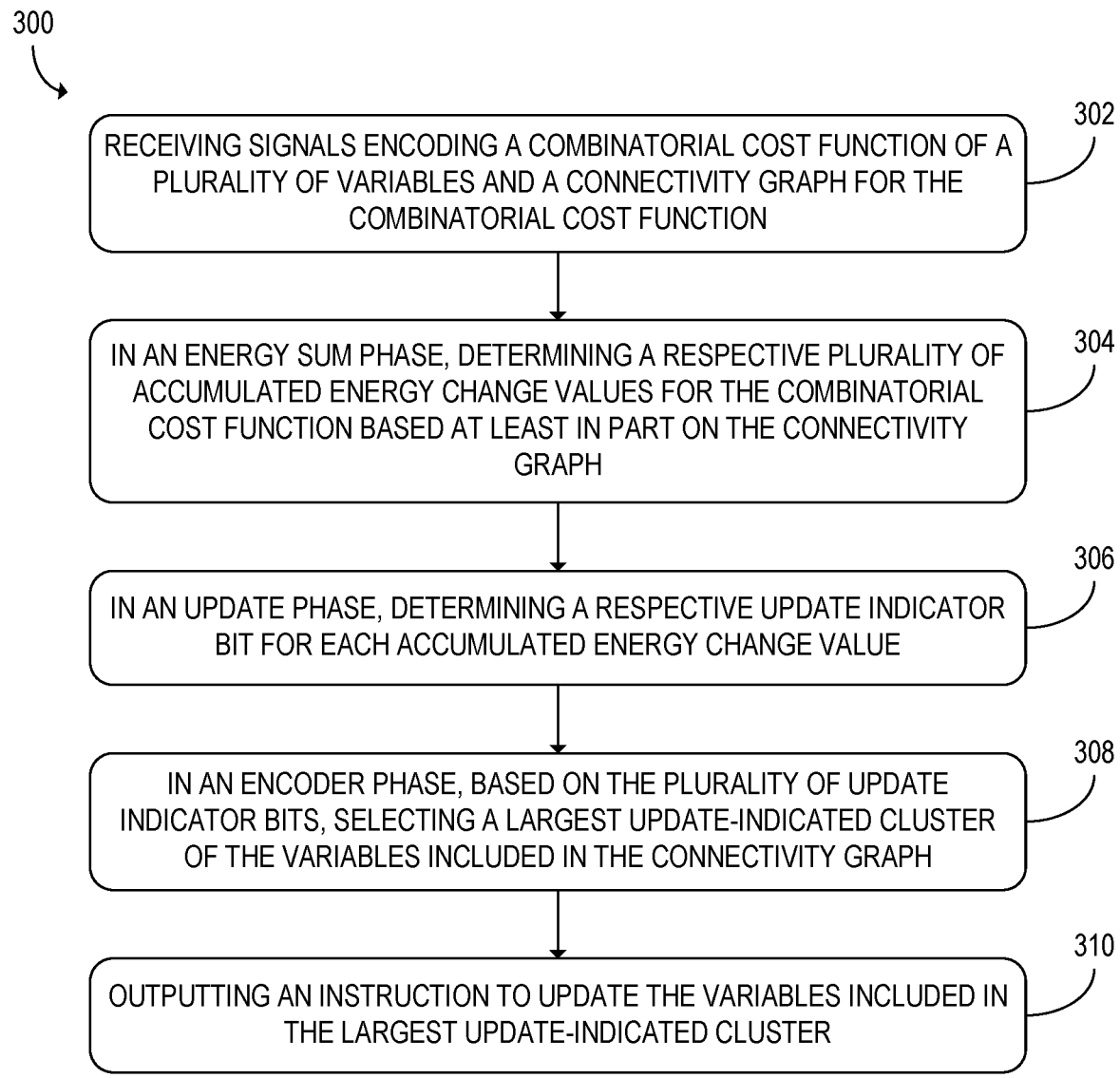
FIG. 8A shows a flowchart of an example method that may be used with a computing device including a cluster update accelerator circuit, according to the embodiment of FIG. 1.

FIG. 8A shows a flowchart of an example method 300 that may be used with a computing device including a cluster update accelerator circuit. The method 300 of FIG. 8A may be used with the computing device 1 of FIG. 1 or with some other computing device that includes a cluster update accelerator circuit. At step 302, the method 300 may include receiving signals encoding a combinatorial cost function of a plurality of variables and a connectivity graph for the combinatorial cost function. These signals may be received from a processor at the cluster update accelerator circuit. The combinatorial cost function may include a plurality of terms that each include one or more variables. The connectivity graph may indicate which variables of the combinatorial cost function appear in terms together by representing each variable with a vertex and having an edge between each pair of variables that appear in a term together. In embodiments in which the connectivity graph has zero or one cycles, the connectivity graph may be encoded as a vector of connectivity indicator bits. Alternatively, the connectivity graph may be encoded in an adjacency matrix.

Figure 8B:
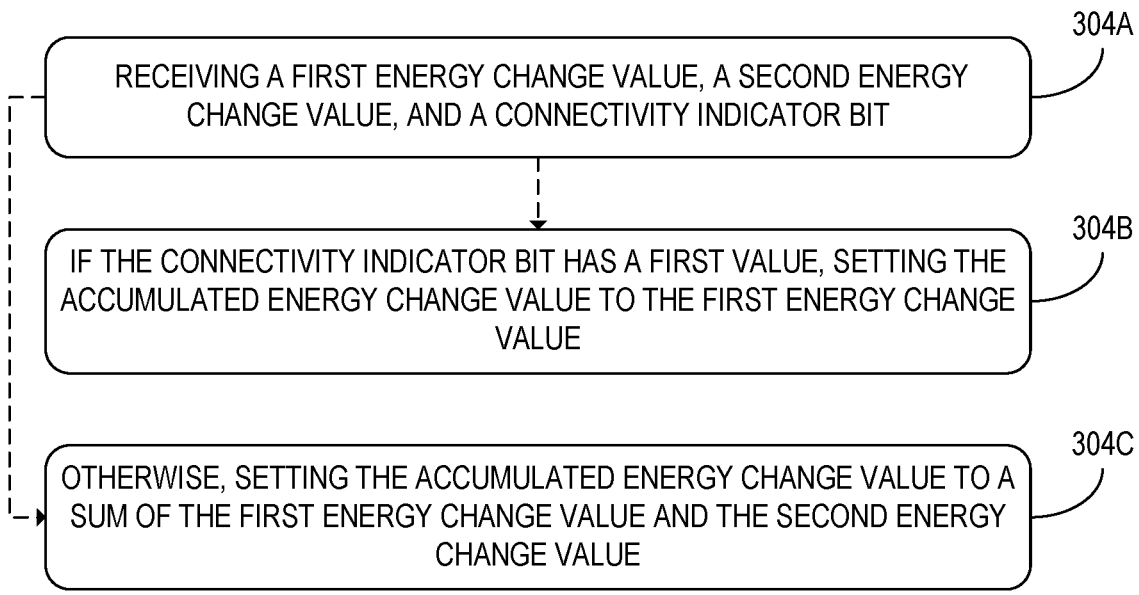
FIG. 8B shows additional steps of the method of FIG. 8A that may be performed in an energy sum phase.

At step 304, the method 300 may further include, in an energy sum phase, determining a respective plurality of accumulated energy change values for the combinatorial cost function based at least in part on the connectivity graph. In some embodiments, step 304 may be performed at a plurality of accumulators included in the cluster update accelerator circuit. FIG. 8B shows additional steps of step 304 that may be performed by each of the plurality of accumulators in such embodiments when determining the accumulated energy change values. At step 304A, the method 300 may further include receiving a first energy change value, a second energy change value, and a connectivity indicator bit. If the connectivity indicator bit has a first value, the method 300 may further include, at step 304B, setting the accumulated energy change value to the first energy change value. Otherwise, the method 300 may further include, at step 304C, setting the accumulated energy change value to a sum of the first energy change value and the second energy change value. Thus, the connectivity indicator bit may be used to determine whether the second energy change value is added to the accumulated energy change value.

Figure 8C:
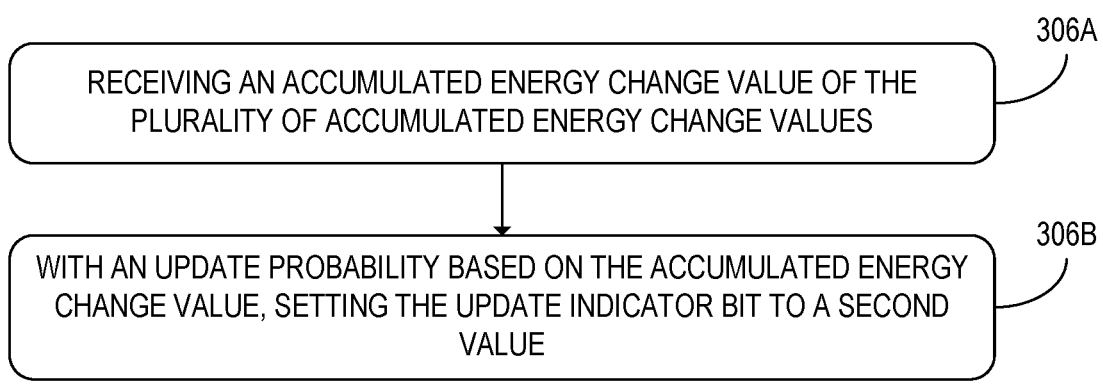
FIG. 8C shows additional steps of the method of FIG. 8A that may be performed in an update phase.

Returning to FIG. 8A, the method 300 may further include an update phase at step 306. In the update phase, the method 300 may further include determining a respective update indicator bit for each accumulated energy change value. Each update indicator bit may, in some embodiments, be determined at a respective update criterion checker included in the cluster update accelerator circuit. In such embodiments, step 306 may further include the additional steps shown in FIG. 8C. At step 306A, the method 300 may further include, at an update criterion checker, receiving an accumulated energy change value of the plurality of accumulated energy change values. The accumulated energy change value may be received from an accumulator included in the cluster update accelerator circuit. At step 306B, the method 300 may further include setting the update indicator bit to a second value with an update probability based on the accumulated energy change value. For example, the update probability may be a function of the accumulated energy change value and a temperature value. Other control parameters of the cluster update accelerator circuit may additionally or alternatively be used when setting the value of the update indicator bit.

Figure 8D:
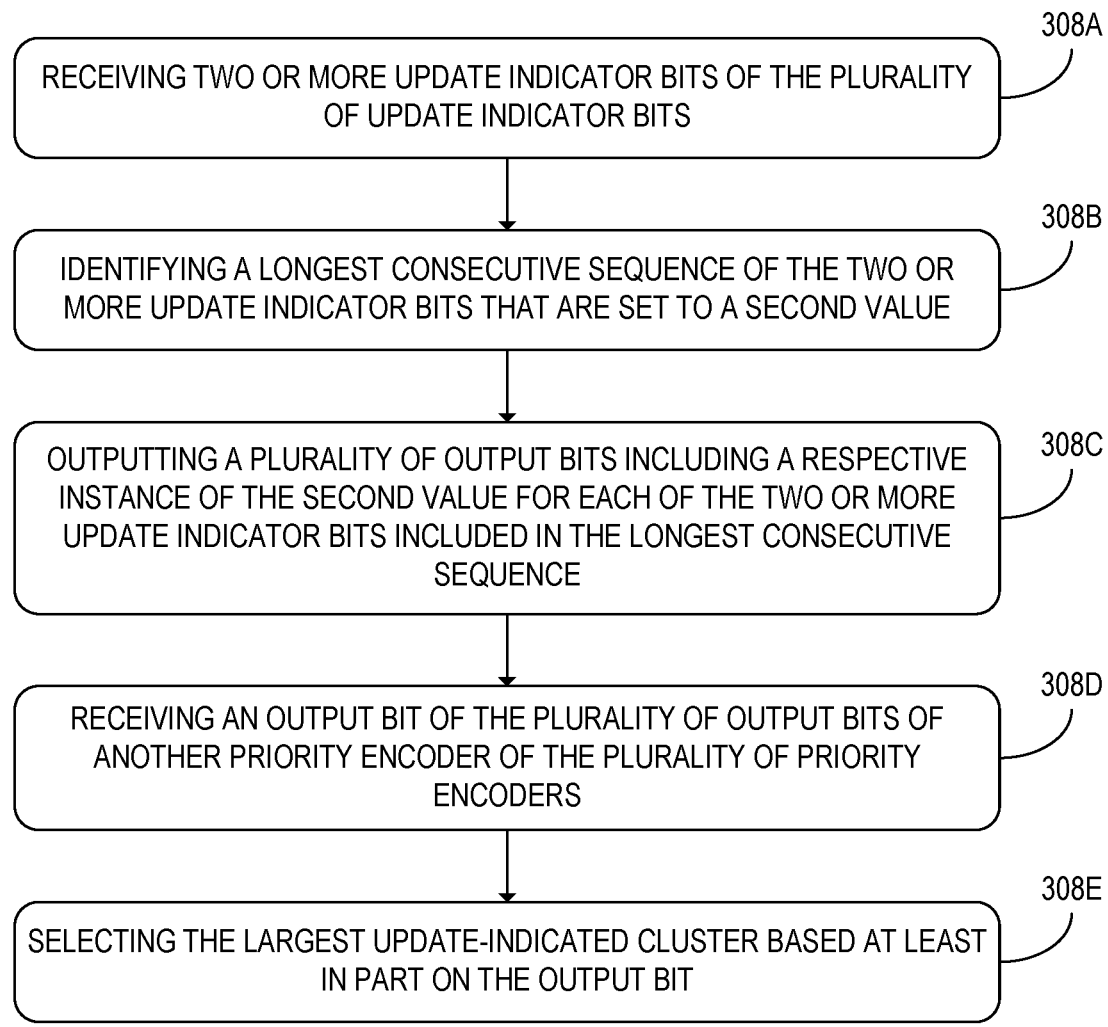
FIG. 8D shows additional steps of the method of FIG. 8A that may be performed in an encoder phase.

In FIG. 8A, the method 300 may further include an encoder phase at step 308. In the encoder phase, the method 300 may further include, based on the plurality of update indicator bits, selecting a largest update-indicated cluster of the variables included in the connectivity graph. FIG. 8D shows additional steps of the method 300 that may be performed when selecting the largest update-indicated cluster at step 308. The steps shown in FIG. 8D may be performed at each of a plurality of priority encoders included in the cluster update accelerator circuit. At step 308A, the method 300 may further include receiving two or more update indicator bits of the plurality of update indicator bits. The two or more update indicator bits may be received from respective update criterion checkers included in the cluster updated accelerator circuit. In addition, the two or more update indicator bits may be received as an ordered sequence. At step 308B, the method 300 may further include identifying a longest consecutive sequence of the two or more update indicator bits that are set to a second value. For example, the update criterion checker may identify a longest consecutive sequence of ones included in the two or more update indicator bits. At step 308C, the method 300 may further include outputting a plurality of output bits including a respective instance of the second value for each of the two or more update indicator bits included in the longest consecutive sequence. For example, the update criterion checker may identify the longest consecutive sequence of ones in the sequence of update indicator bits it receives. In this example, the update criterion checker may then output a respective one corresponding to each one included in the longest sequence and may output a respective zero corresponding to each zero and to each one not included in the longest sequence.

In some embodiments, at at least one priority encoder of the plurality of priority encoders, the method 300 may further include, at step 308D, receiving an output bit of the plurality of output bits of another priority encoder of the plurality of priority encoders. For example, each priority encoder except for a first priority encoder may receive a respective output bit from a previous priority encoder in a sequence of priority encoders. At step 308E, the method 300 may further include selecting the largest update-indicated cluster based at least in part on the output bit. For example, the output bit received from the other priority encoder may indicate whether the last update indicator bit received by the other priority encoder is included in the longest consecutive sequence of update indicator bits that are set to the second value (e.g. one). In this example, when the output bit indicates that the last update indicator bit is included in the longest consecutive sequence, the priority encoder may output the second value for each respective update indicator bit at the beginning of the sequence of update indicator bits it receives that have the second value. Thus, the priority encoder may extend a longest consecutive sequence that started at the previous priority encoder.

Figure 8E:
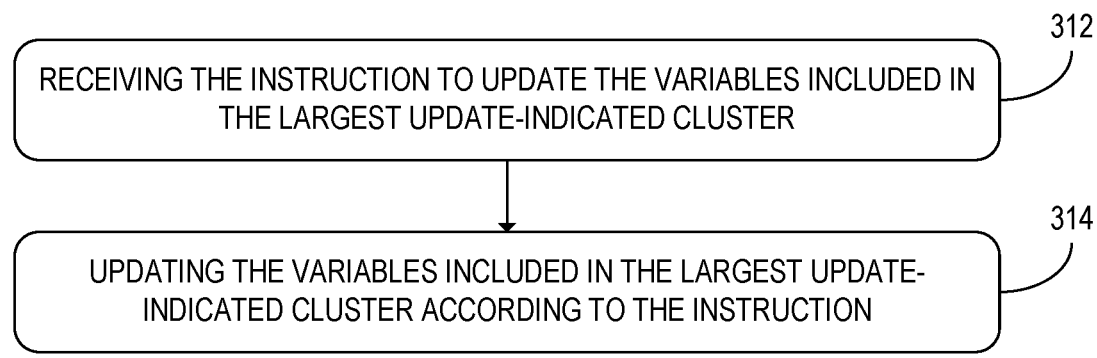
FIG. 8E shows additional steps of the method of FIG. 8A that may be performed at a processor.

Returning to FIG. 8A, the method 300 may further include, at step 310, outputting an instruction to update the variables included in the largest update-indicated cluster. For example, the instruction may include a vector of the output bits of the plurality of priority encoders. The instruction may be output to a processor included in the computing device. FIG. 8E shows additional steps of the method 300 that may be performed at the processor. At step 312, the method 300 may further include receiving the instruction to update the variables included in the largest update-indicated cluster. At step 314, the method 300 may further include updating the variables included in the largest update-indicated cluster according to the instruction. For example, one or more of the variables of the combinatorial cost function may be updated when performing a simulated annealing, simulated quantum annealing, or parallel tempering algorithm. When performing one of these algorithms, the variables of the combinatorial cost function may be updated when performing an isoenergetic cluster move, a Wolff update, or a Swendsen-Wang update. Alternatively, other cost function optimization algorithms and other types of cluster update may be performed.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
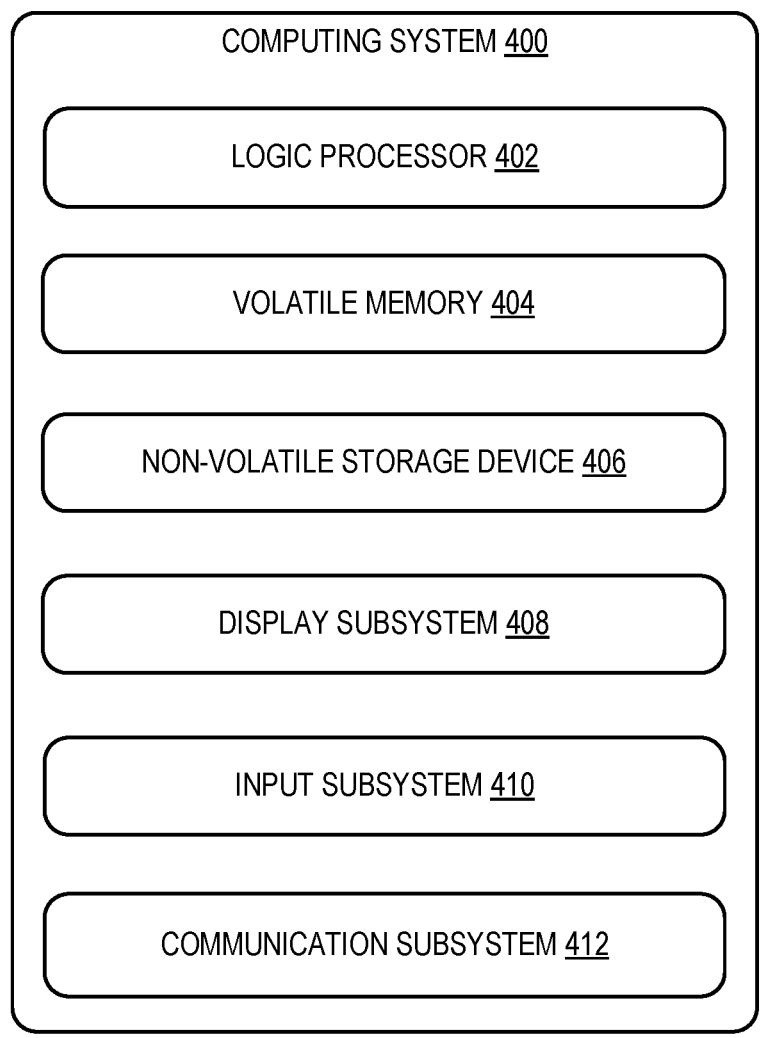
FIG. 9 shows a schematic view of an example computing environment in which the computing device of FIG. 1 may be enacted.

FIG. 9 schematically shows a non-limiting embodiment of a computing system 400 that can enact one or more of the methods and processes described above. Computing system 400 is shown in simplified form. Computing system 400 may embody the computing device 1 described above and illustrated in FIG. 1. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 9.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

According to one aspect of the present disclosure, a computing device is provided, including a cluster update accelerator circuit configured to receive signals encoding a combinatorial cost function of a plurality of variables and a connectivity graph for the combinatorial cost function. In an energy sum phase, the cluster update accelerator circuit may be further configured to determine a respective plurality of accumulated energy change values for the combinatorial cost function based at least in part on the connectivity graph. In an update phase, the cluster update accelerator circuit may be further configured to determine a respective update indicator bit for each accumulated energy change value. In an encoder phase, based on the plurality of update indicator bits, the cluster update accelerator circuit may be further configured to select a largest update-indicated cluster of the variables included in the combinatorial cost function. The cluster update accelerator circuit may be further configured to output an instruction to update the variables included in the largest update-indicated cluster.

According to this aspect, each accumulated energy change value may be determined at an accumulator configured to receive a first energy change value, a second energy change value, and a connectivity indicator bit. The accumulator may be further configured to, if the connectivity indicator bit has a first value, set the accumulated energy change value to the first energy change value. Otherwise, the accumulator may be further configured to set the accumulated energy change value to a sum of the first energy change value and the second energy change value.

According to this aspect, the connectivity graph may be a vector of the connectivity indicator bits of the variables included in the combinatorial cost function.

According to this aspect, each update indicator bit may be determined at a respective update criterion checker configured to receive an accumulated energy change value of the plurality of accumulated energy change values. The update criterion checker may be further configured to, with an update probability based on the accumulated energy change value, set the update indicator bit to a second value.

According to this aspect, the largest update-indicated cluster may be selected by a plurality of priority encoders each configured to receive two or more update indicator bits of the plurality of update indicator bits. The priority encoder may be further configured to identify a longest consecutive sequence of the two or more update indicator bits that are set to a second value. The priority encoder may be further configured to output a plurality of output bits including a respective instance of the second value for each of the two or more update indicator bits included in the longest consecutive sequence.

According to this aspect, at least one priority encoder of the plurality of priority encoders may be further configured to receive an output bit of the plurality of output bits of another priority encoder of the plurality of priority encoders. The at least one priority encoder may be further configured to select the largest update-indicated cluster based at least in part on the output bit.

According to this aspect, the computing device may further include a processor configured to receive the instruction to update the variables included in the largest update-indicated cluster. The processor may be further configured to update the variables included in the largest update-indicated cluster according to the instruction.

According to this aspect, the processor may be configured to update the variables of the combinatorial cost function when performing a simulated annealing, simulated quantum annealing, or parallel tempering algorithm.

According to this aspect, the processor may be configured to update the variables of the combinatorial cost function when performing an isoenergetic cluster move, a Wolff update, or a Swendsen-Wang update.

According to this aspect, each variable of the combinatorial cost function may be a binary variable.

According to this aspect, the cluster update accelerator circuit may be a field-programmable gate array (FPGA) or an application-specific integrated circuit (ASIC).

According to another aspect of the present disclosure, a method for use with a computing device including a cluster update accelerator circuit is provided. The method may include receiving signals encoding a combinatorial cost function of a plurality of variables and a connectivity graph for the combinatorial cost function. In an energy sum phase, the method may further include determining a respective plurality of accumulated energy change values for the combinatorial cost function based at least in part on the connectivity graph. In an update phase, the method may further include determining a respective update indicator bit for each accumulated energy change value. In an encoder phase, the method may further include, based on the plurality of update indicator bits, selecting a largest update-indicated cluster of the variables included in the connectivity graph. The method may further include outputting an instruction to update the variables included in the largest update-indicated cluster.

According to this aspect, determining each accumulated energy change value may include, at an accumulator included in the cluster update accelerator circuit, receiving a first energy change value, a second energy change value, and a connectivity indicator bit. Determining the accumulated energy change value may further include, if the connectivity indicator bit has a first value, setting the accumulated energy change value to the first energy change value. Otherwise, determining the accumulated energy change value may further include setting the accumulated energy change value to a sum of the first energy change value and the second energy change value.

According to this aspect, the connectivity graph may be a vector of the connectivity indicator bits of the variables included in the combinatorial cost function.

According to this aspect, determining each update indicator bit may include, at a respective update criterion checker included in the cluster update accelerator circuit, receiving an accumulated energy change value of the plurality of accumulated energy change values. Determining the update indicator bit may further include, with an update probability based on the accumulated energy change value, setting the update indicator bit to a second value.

According to this aspect, selecting the largest update-indicated cluster may include, at each of a plurality of priority encoders included in the cluster update accelerator circuit, receiving two or more update indicator bits of the plurality of update indicator bits. Selecting the largest update-indicated cluster may further include identifying a longest consecutive sequence of the two or more update indicator bits that are set to a second value. Selecting the largest update-indicated cluster may further include outputting a plurality of output bits including a respective instance of the second value for each of the two or more update indicator bits included in the longest consecutive sequence.

According to this aspect, the method may further include, at at least one priority encoder of the plurality of priority encoders, receiving an output bit of the plurality of output bits of another priority encoder of the plurality of priority encoders. The method may further include selecting the largest update-indicated cluster based at least in part on the output bit.

According to this aspect, the method may further include, at a processor included in the computing device, receiving the instruction to update the variables included in the largest update-indicated cluster. The method may further include updating the variables included in the largest update-indicated cluster according to the instruction. The variables of the combinatorial cost function may be updated when performing a simulated annealing, simulated quantum annealing, or parallel tempering algorithm.

According to this aspect, the variables of the combinatorial cost function may be updated when performing an isoenergetic cluster move, a Wolff update, or a Swendsen-Wang update.

According to another aspect of the present disclosure, a server computing device is provided, including a processor configured to receive a combinatorial cost function of a plurality of variables via a network. The processor may be further configured to output signals encoding the combinatorial cost function and a connectivity graph for the combinatorial cost function. The server computing device may further include a cluster update accelerator circuit configured to receive the signals from the processor. In an energy sum phase, the cluster update accelerator circuit may be further configured to determine a respective plurality of accumulated energy change values for the combinatorial cost function based at least in part on the connectivity graph. In an update phase, the cluster update accelerator circuit may be further configured to determine a respective update indicator bit for each accumulated energy change value. In an encoder phase, based on the plurality of update indicator bits, the cluster update accelerator circuit may be further configured to select a largest update-indicated cluster of the variables included in the connectivity graph. The cluster update accelerator circuit may be further configured to output, to the processor, an instruction to update the variables included in the largest update-indicated cluster. The processor may be further configured to receive the instruction to update the variables included in the largest update-indicated cluster. The processor may be further configured to update the variables included in the largest update-indicated cluster according to the instruction.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a cluster update accelerator circuit configured to:
receive signals encoding a combinatorial cost function of a plurality of variables and a connectivity graph for the combinatorial cost function;
in an energy sum phase, determine a respective plurality of accumulated energy change values for the combinatorial cost function based at least in part on the connectivity graph;
in an update phase, determine a respective update indicator bit for each accumulated energy change value;
in an encoder phase, based on the plurality of update indicator bits, select a largest update-indicated cluster of the variables included in the combinatorial cost function; and
output an instruction to update the variables included in the largest update-indicated cluster.

2. The computing device of claim 1, wherein each accumulated energy change value is determined at an accumulator configured to:
receive a first energy change value, a second energy change value, and a connectivity indicator bit;
if the connectivity indicator bit has a first value, set the accumulated energy change value to the first energy change value; and
otherwise, set the accumulated energy change value to a sum of the first energy change value and the second energy change value.

3. The computing device of claim 2, wherein the connectivity graph is a vector of the connectivity indicator bits of the variables included in the combinatorial cost function.

4. The computing device of claim 1, wherein each update indicator bit is determined at a respective update criterion checker configured to:
receive an accumulated energy change value of the plurality of accumulated energy change values; and
with an update probability based on the accumulated energy change value, set the update indicator bit to a second value.

5. The computing device of claim 1, wherein the largest update-indicated cluster is selected by a plurality of priority encoders each configured to:
receive two or more update indicator bits of the plurality of update indicator bits;
identify a longest consecutive sequence of the two or more update indicator bits that are set to a second value; and
output a plurality of output bits including a respective instance of the second value for each of the two or more update indicator bits included in the longest consecutive sequence.

6. The computing device of claim 5, wherein at least one priority encoder of the plurality of priority encoders is further configured to:
receive an output bit of the plurality of output bits of another priority encoder of the plurality of priority encoders; and
select the largest update-indicated cluster based at least in part on the output bit.

7. The computing device of claim 1, further comprising a processor configured to:
receive the instruction to update the variables included in the largest update-indicated cluster; and
update the variables included in the largest update-indicated cluster according to the instruction.

8. The computing device of claim 7, wherein the processor is configured to update the variables of the combinatorial cost function when performing a simulated annealing, simulated quantum annealing, or parallel tempering algorithm.

9. The computing device of claim 7, wherein the processor is configured to update the variables of the combinatorial cost function when performing an isoenergetic cluster move, a Wolff update, or a Swendsen-Wang update.

10. The computing device of claim 1, wherein each variable of the combinatorial cost function is a binary variable.

11. The computing device of claim 1, wherein the cluster update accelerator circuit is a field-programmable gate array (FPGA) or an application-specific integrated circuit (ASIC).

12. A method for use with a computing device including a cluster update accelerator circuit, the method comprising:
receiving signals encoding a combinatorial cost function of a plurality of variables and a connectivity graph for the combinatorial cost function;
in an energy sum phase, determining a respective plurality of accumulated energy change values for the combinatorial cost function based at least in part on the connectivity graph;
in an update phase, determining a respective update indicator bit for each accumulated energy change value;
in an encoder phase, based on the plurality of update indicator bits, selecting a largest update-indicated cluster of the variables included in the connectivity graph; and
outputting an instruction to update the variables included in the largest update-indicated cluster.

13. The method of claim 12, wherein determining each accumulated energy change value includes, at an accumulator included in the cluster update accelerator circuit:
receiving a first energy change value, a second energy change value, and a connectivity indicator bit;

if the connectivity indicator bit has a first value, setting the accumulated energy change value to the first energy change value; and otherwise, setting the accumulated energy change value to a sum of the first energy change value and the second energy change value.

14. The method of claim 13, wherein the connectivity graph is a vector of the connectivity indicator bits of the variables included in the combinatorial cost function.

15. The method of claim 12, wherein determining each update indicator bit includes, at a respective update criterion checker included in the cluster update accelerator circuit:

receiving an accumulated energy change value of the plurality of accumulated energy change values; and with an update probability based on the accumulated energy change value, setting the update indicator bit to a second value.

16. The method of claim 12, wherein selecting the largest update-indicated cluster includes, at each of a plurality of priority encoders included in the cluster update accelerator circuit:

receiving two or more update indicator bits of the plurality of update indicator bits;

identifying a longest consecutive sequence of the two or more update indicator bits that are set to a second value; and outputting a plurality of output bits including a respective instance of the second value for each of the two or more update indicator bits included in the longest consecutive sequence.

17. The method of claim 16, further comprising, at at least one priority encoder of the plurality of priority encoders:

receiving an output bit of the plurality of output bits of another priority encoder of the plurality of priority encoders; and selecting the largest update-indicated cluster based at least in part on the output bit.

18. The method of claim 12, further comprising, at a processor included in the computing device:

receiving the instruction to update the variables included in the largest update-indicated cluster; and updating the variables included in the largest update-indicated cluster according to the instruction, wherein the variables of the combinatorial cost function are updated when performing a simulated annealing, simulated quantum annealing, or parallel tempering algorithm.

19. The method of claim 18, wherein the variables of the combinatorial cost function are updated when performing an isoenergetic cluster move, a Wolff update, or a Swendsen-Wang update.

20. A server computing device comprising:

a processor configured to:

receive a combinatorial cost function of a plurality of variables via a network; and output signals encoding the combinatorial cost function and a connectivity graph for the combinatorial cost function; and a cluster update accelerator circuit configured to:

receive the signals from the processor;

in an energy sum phase, determine a respective plurality of accumulated energy change values for the combinatorial cost function based at least in part on the connectivity graph;

in an update phase, determine a respective update indicator bit for each accumulated energy change value;

in an encoder phase, based on the plurality of update indicator bits, select a largest update-indicated cluster of the variables included in the connectivity graph; and output, to the processor, an instruction to update the variables included in the largest update-indicated cluster;

wherein the processor is further configured to:

receive the instruction to update the variables included in the largest update-indicated cluster; and update the variables included in the largest update-indicated cluster according to the instruction.

* * * * *